J. W. McELFRESH.
REGULATOR FOR WINDMILLS.
APPLICATION FILED JAN. 23, 1915.
1,174,513.
Patented Mar. 7, 1916.
4 SHEETS—SHEET 4.
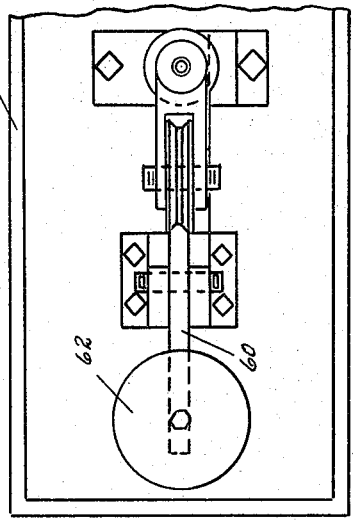
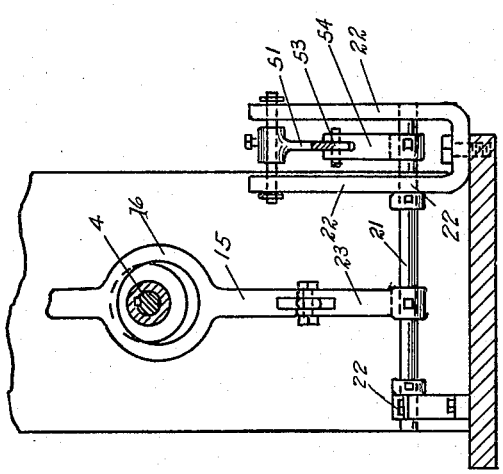
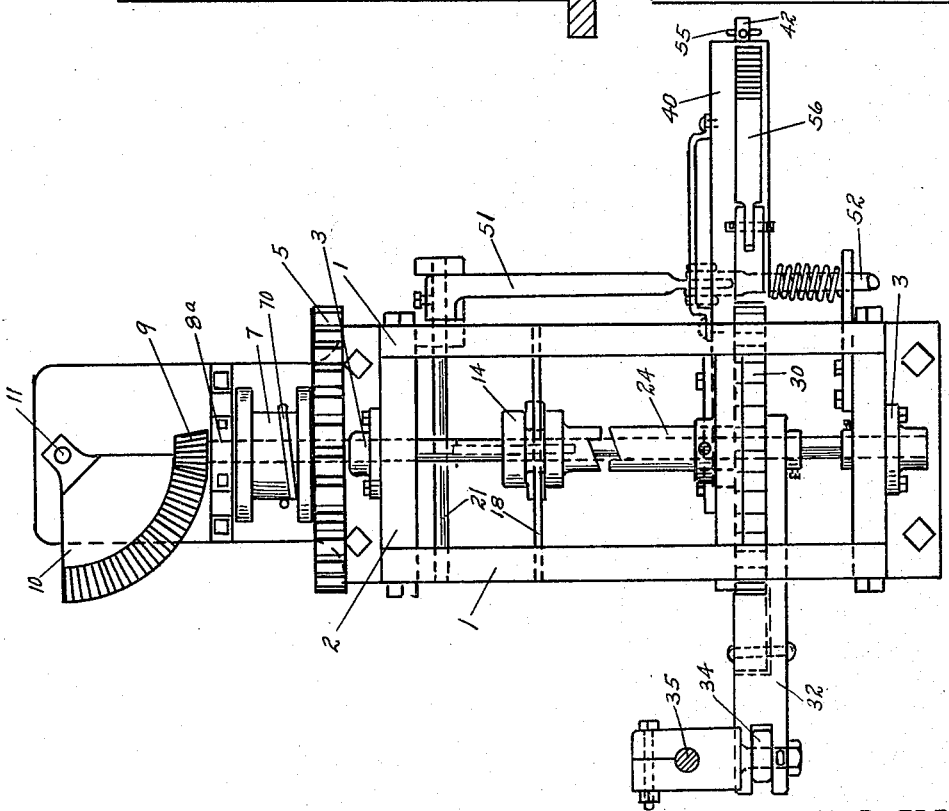
WITNESSES:
INVENTOR
J. W. McElfresh
ATTORNEY

UNITED STATES PATENT OFFICE.

JOSEPH W. McELFRESH, OF OLUSTEE, OKLAHOMA.

REGULATOR FOR WINDMILLS.

1,174,513.　　　　Specification of Letters Patent.　　Patented Mar. 7, 1916.

Application filed January 23, 1915. Serial No. 3,861.

*To all whom it may concern:*

Be it known that I, JOSEPH W. McELFRESH, a citizen of the United States, residing at Olustee, in the county of Jackson and State of Oklahoma, have invented certain new and useful Improvements in Regulators for Windmills, of which the following is a specification.

My invention has relation to a wind mill and in such connection it relates more particularly to a device for automatically starting or stopping the wind mill as well as controlling the valve to the waste pipe or pipe for draining the water from the pipe leading to the tank or cistern.

My invention is applicable to the class of wind mills wherein the wheel operates, through a crank shaft or eccentric, a reciprocatory pump located in the well to thereby force water, through a system of piping, from the well into a tank or cistern. This tank or cistern may be located upon the ground or my be elevated some distance from the ground to supply through suitable piping the house, barn, etc. In such wind mills the wheel and its shaft carry a vane by means of which the wheel is always presented in operative position against the wind unless the vane be folded or moved into inoperative position, etc.

The principal objects of my present invention are first to provide a simple and comparatively inexpensive device for automatically stopping the operation of the wind wheel, said device preferably controlling the valve for the waste or drainage pipe; second to provide in such a device a means for stopping automatically the operation of the wheel for the wind mill, said means controlled by mechanism operated by the height of water in the tank or cistern supplied by the pump operated by the wind mill; and third to provide in such a device an arrangement and construction of parts whereby the device may be automatically or manually operated as occasion requires.

The nature and scope of my invention will be more fully understood from the following description taken in connection with the accompanying drawings, forming part hereof, in which—

Figure 1:
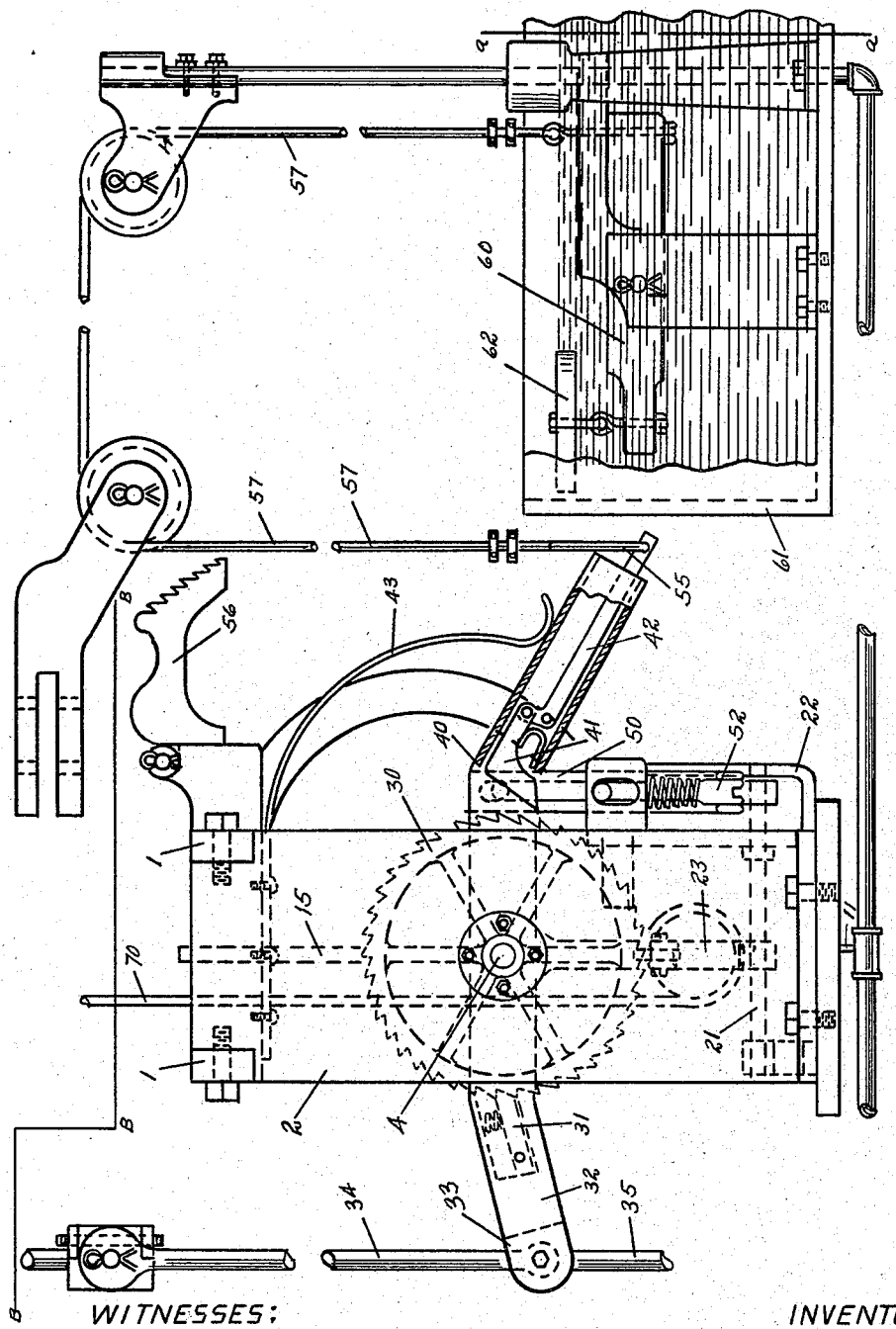
Figure 2:
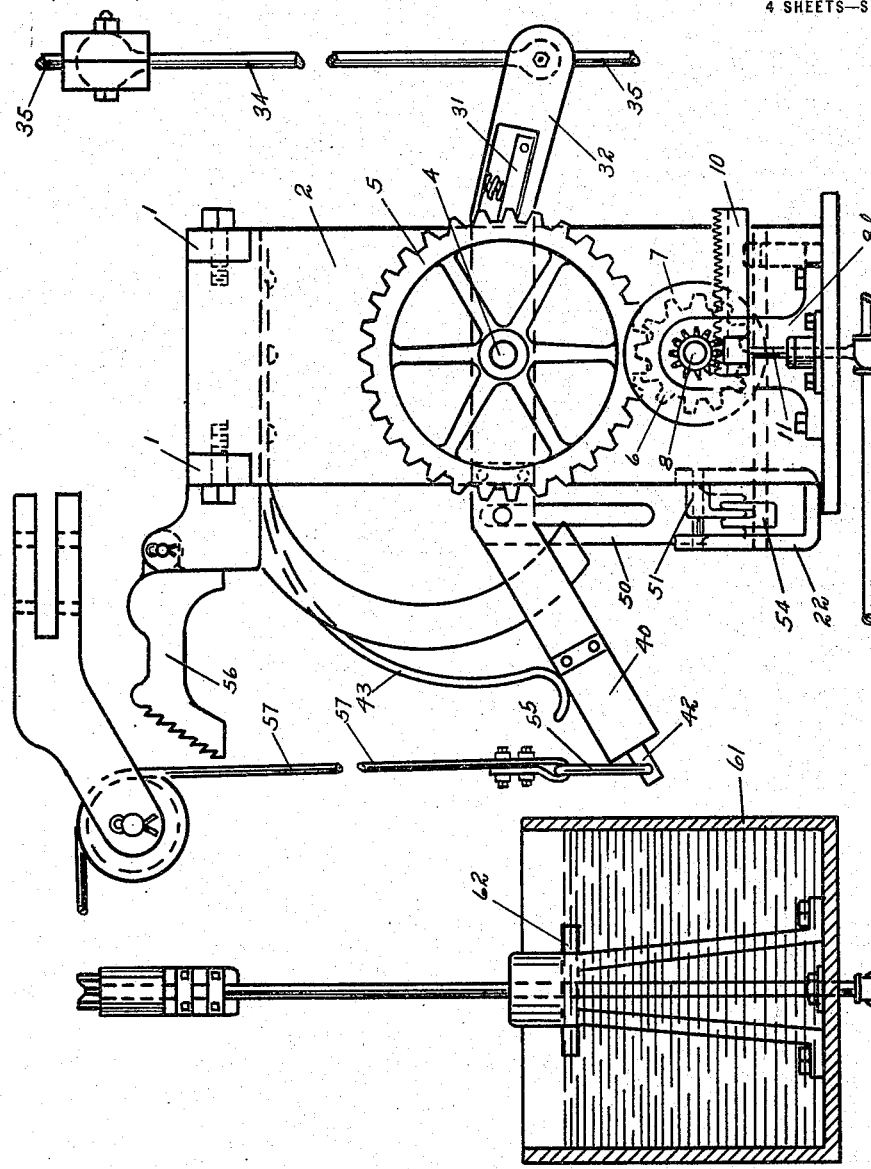
Figure 3:
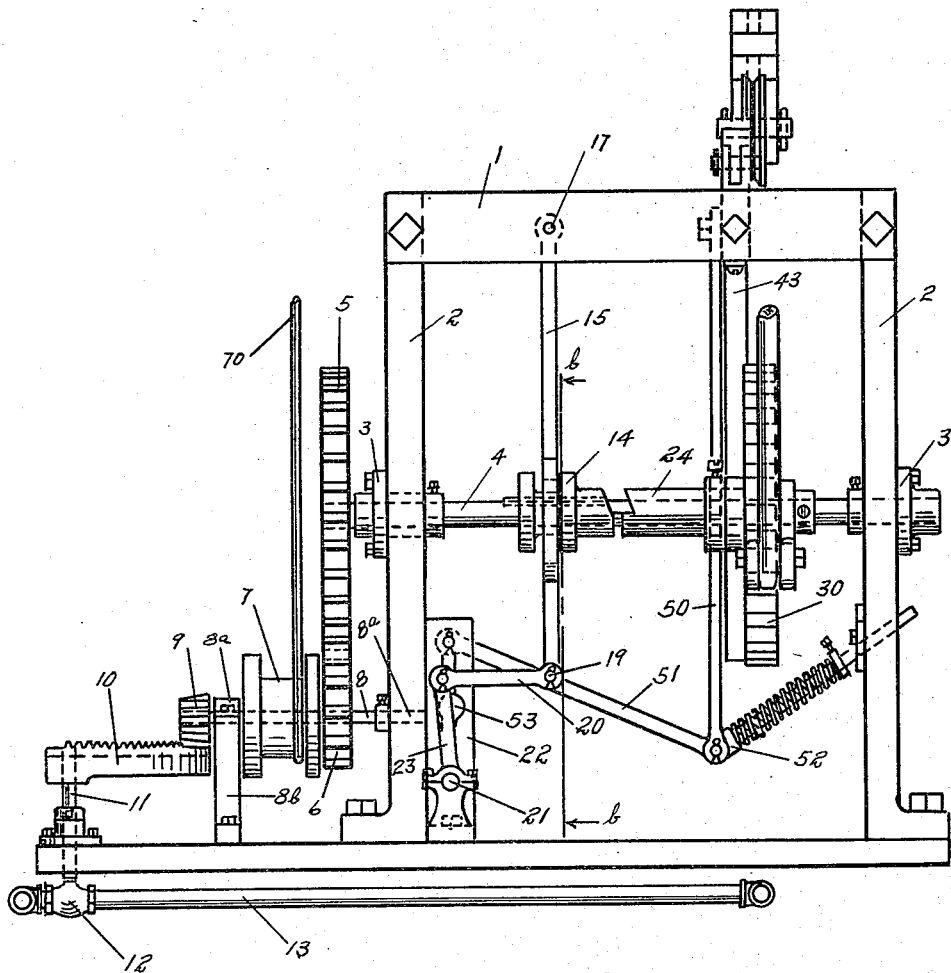

Figure 1 is a front elevational view partly broken away of the device embodying main features of my invention. Fig. 2 is a rear elevational view of that part of the device for controlling the stopping or starting of the pump rod. Fig. 3 is a side elevational view of the same. Fig. 4 is a top or plan view looking down on the plane of line B, B, B, of Fig. 1. Fig. 5 is a vertical sectional view of the tank taken on line $a$—$a$ of Fig. 1. Fig. 6 is a top or plan view of the tank and mechanism located therein, and Fig. 7 is a vertical sectional view taken on line $b$—$b$ of Fig. 3.

Referring to the drawings 1 represents the frame for the stopping and starting device and in the form preferred it is substantially box shaped with closed front and rear ends 2. In the end frames 2 are formed bearings 3 for a main shaft 4. At the left hand end (Fig. 3) of shaft 4 is keyed or otherwise secured a gear wheel 5, meshing with a pinion 6 fixed to a drum or spool 7 rotating with a pin or stub shaft 8. The pin or shaft 8 rotates in suitable bearings $8^a$ formed in an upright $8^b$ and also in a suitable bearing formed in the end frame 2. The shaft 8 projects beyond the bearing $8^a$ in the upright $8^b$ and carries a miter gear 9 meshing with the toothed face of a sector lever 10. This sector lever 10 carries at its axis a vertical key rod 11 engaging the valve 12 of the waste or drainage pipe 13 for the apparatus.

Splined or otherwise slidably secured to the shaft 4 within the box frame 1 is a clutch collar 14 operated by a clutch lever 15, having a ring shaped body 16 surrounding the collar 14 and having its upper end pivoted as at 17 in a cross bar 18 spanning the upper ends of frame 1. The lower end of clutch lever 15 is pivoted as at 19 to an elbow arm 20 projecting from and rocking with a rock shaft 21 having its bearings in offsets 22 of the end frame 2 below clutch collar 14. To one end of the rock shaft 21 is secured a crank arm 23.

Loosely turning on shaft 4 adjacent to clutch collar 14 is a complementally formed collar or sleeve 24 adapted to interlock with the collar 14 when said collar 14 is shifted in one direction on shaft 4 by the rock shaft 21. This complemental clutch collar or sleeve 24 is carried by a ratchet wheel 30. The ratchet wheel 30 is adapted to be advanced in one direction on the shaft 4 turning idly thereon when clutch collar 24 is not locked to clutch collar 14, and turning in the same direction to operate, when the clutch collars are locked together, the shaft 4 and gear wheel 5. A preferred means for turning ratchet wheel 30 consists of the spring pawl 31 carried by an arm 32. The arm 32 is supported to rock at one end on shaft 4 and its outer free end 33 is connected by a link connection 34 to the pump rod 35. It follows that when the arm 32 is raised by the pump rod 35 the spring pawl 31 will rotate the ratchet wheel 30, but when the arm 32 is lowered by said pump rod 35 the pawl 31 swings loosely over the ratchet wheel 30 without moving the same. Normally the ratchet 30 and the clutch sleeve 24 are idle with respect to shaft 4 and gear wheel 5, but when clutch collar 14 is shifted on shaft 4 into locking engagement with collar 24 then the ratchet wheel 30 will operate said shaft 4 and its gear wheel.

A preferred means for operating the clutch collar 14 to shift it on the shaft consists of the following parts arranged as illustrated in the drawings. An arm 40 rocking freely at its inner end upon the shaft 4 carries a spring pawl 41 operated or thrown into or out of engagement with the teeth of the ratchet wheel 30 by means of the lever 42 toggled to the ratchet. A flat spring 43 fixed at one end to the frame 1 and bearing at its free end upon the arm 40 serves to normally depress the arm 40. When the arm 40 is raised by elevating lever 42, the pawl 41 is thrown into engagement with the teeth of ratchet wheel 30. At the same time the arm 40 in moving upward will raise a toggle link 50 one end of which is pivotally connected to the arm 40. The lower end of this link 50 connects pivotally to one end of a connecting rod 51 and to one end of a spring controlled arm 52, the lower end of link 50 and the ends of rod 51 and arm 52 being all pivotally connected together. The rod 51 at its other end is pivotally connected as at 53 to a crank arm 54 operating the rock shaft 21. As hereinbefore described this rock shaft 21 controls through elbow arm 20 the operation of the clutch lever 15 and the consequent shifting of the clutch collar 14. The spring controlled arm 52 serves normally to depress the connecting rod 51 to its lower or inoperative position. The arm 40 may be elevated or depressed by hand and when elevated may be locked to that position by means of a latch 55 carried by free end of pawl lever 42 slipping over a notched bar 56 secured to the frame work 1 of the device. The arm 40 may also be operated automatically by connecting the latch 55 by cord or chain 57 to one end of a lever arm 60 arranged in the tank or cirtern 61. A float 62 attached to the other end of lever arm 60 will serve to depress the end of the arm 60 to which cord or chain 57 is secured when water in the tank rises above a predetermined normal or full level in said tank 61. The depression of this end of lever arm to which the chain 57 is connected will pull through chain 57 the latch 55 and arm 40 upward but should the water in tank 61 fall below the normal level, the float in falling will permit the lever arm to rise and through chain or cord 57 will permit arm 40 to be lowered by its spring 43. It will thus be seen that when arm 40 is raised either manually or automatically by the float 62, the clutch collars 14 and 24 are locked and the ratchet wheel 30 operated by the reciprocating pump rod 35 will turn the shaft 4 and gear 5. The gear 5 in turning will rotate drum 7 and also the sector lever 10. This movement of sector lever 10 will open the waste valve 12. By winding a cord or chain 70 off the drum 7 and connecting the drum 7 thereby to the vane of the wind mill (not shown) in any suitable manner, the rotation of the drum 7 may be utilized through cord or chain 70 to throw the vane into inoperative position and thus cause the pump rod 35 to cease its reciprocation and hence stop the pump.

When the lever arm 40 is dropped to disconnect the clutch sleeves 14 and 24, the vane (not shown) will be permitted to swing to its normal operative position and will through cord 70 reverse the movement of drum 7 and, through its connection, will thereby reverse the movement of the sector lever 10 controlling the valve 12. The sector lever 10 responds to the rise and fall of the float 62 in that when said float rises above normal level, it causes the arm 40 to be raised and through said arm 40 and toggle link 50 and rod 51 operates the clutch mechanism so as to connect the constantly rotating ratchet wheel 30 with the shaft 4 carrying the gear 5. As before explained the revolution of gear 5 in one direction will operate sector lever 10 to open valve 12 and thus permit the excess water entering the tank 61 to drain off through pipe 13. When, however, the float 62 sinks, the arm 40 falls under tension of spring 43 and gives a reverse movement to ratchet 30 at the same time or shortly thereafter permitting the clutch mechanism to be released. This reverse movement to ratchet 30 serves to operate the sector lever 10 so that valve 12 will close and flow of water from the tank through the drainage pipe 13 is closed.

In case the apparatus is to be permanently thrown out of action, the pump is stopped and all water in the system is drained off through pipe 13—the valve 12 being manipulated through sector lever 10 to open position either by hand or through a hand or automatic movement of the shaft 4. The float 62 will not operate the sector lever until the water in the tank rises above the normal or full mark. It operates the valve 12 and the drum simultaneously only so long as the water remains above this mark. When from drainage and distribution through the water system the water level falls to normal the float closes the valve 12 and releases the cord 70 to permit the vane under spring tension to turn to operative position and thereby start the pump.

Having thus described the nature and objects of my invention, what I claim as new and desire to secure by Letters Patent, is—

1. In a device of the character described, a waste valve, a reciprocatory pump rod, a ratchet wheel adapted to be advanced in one direction, a means connecting the ratchet wheel with the pump rod and controlling the movement of said ratchet wheel, a shaft whereon said ratchet wheel normally revolves loosely, a mechanism controlled by said shaft for operating the waste valve for the pumping system, and means for connecting and disconnecting said mechanism and shaft with said ratchet wheel.

2. In a device of the character described, a waste valve, a mechanism for controlling the operation of the waste valve of the pumping system, a means for stopping the rotation of the wind mill and a ratchet wheel mechanism controlling the operation of said mechanism and means, combined with a reciprocatory pump rod and means for operating said ratchet wheel said means controlled by the pump rod.

3. In a device of the character described, in combination with a reciprocatory pump rod and a valve controlling the waste pipe of the pumping system, of a means for operating said waste valve, said means operated by the pump rod, a float mechanism located in the cistern of the pumping system and means controlled by said float mechanism and adapted to connect or disconnect the valve operating means with the reciprocatory pump rod.

4. In a device of the character described, a reciprocatory pump rod, a ratchet wheel, a pawl connected with and operated by the pump rod, said pawl in engagement with said ratchet wheel, a waste valve for the pumping system, a mechanism for controlling the waste valve, and a clutch mechanism arranged to connect the waste valve controlling mechanism with said ratchet wheel, combined with means for operating said clutch mechanism.

5. In a device of the character described, a reciprocatory pump rod, a ratchet wheel, a pawl connected with and operated by the pump rod, said pawl in engagement with said ratchet wheel, a waste valve for the pumping system, a mechanism for controlling the waste valve, and a clutch mechanism arranged to connect the waste valve controlling mechanism with said ratchet wheel, combined with means for operating said clutch mechanism, and a means controlled by said clutch mechanism for stopping the wind mill.

In testimony whereof I have signed my name to this specification in the presence of two subscribing witnesses.

JOSEPH W. McELFRESH.

Witnesses:
L. R. LOUD,
L. W. KITCHING.

Copies of this patent may be obtained for five cents each, by addressing the "Commissioner of Patents, Washington, D. C."